United States Patent [19]

Visneski

[11] Patent Number: 5,216,058
[45] Date of Patent: Jun. 1, 1993

[54] STABILIZER COMPOSITIONS FOR HALOGEN-CONTAINING POLYMERS AND POLYMER COMPOSITIONS CONTAINING SAME

[75] Inventor: Edmund V. Visneski, Austin, Tex.

[73] Assignee: Vista Chemical Company, Houston, Tex.

[21] Appl. No.: 862,325

[22] Filed: Apr. 2, 1992

[51] Int. Cl.$^5$ .......................... C08K 5/34; C09K 15/02
[52] U.S. Cl. .................. 524/357; 252/400.3; 524/436; 524/450
[58] Field of Search ............... 524/450, 436; 252/400.3, 357

[56] References Cited

U.S. PATENT DOCUMENTS

| | | | |
|---|---|---|---|
| 4,000,100 | 12/1976 | Baldyga | 524/450 |
| 4,371,656 | 2/1983 | Kashiwase et al. | 524/450 |
| 4,427,816 | 1/1984 | Aoki et al. | 524/357 |
| 5,004,776 | 4/1991 | Tadenuma et al. | 524/450 |
| 5,106,898 | 4/1992 | Nosu et al. | 524/436 |
| 5,141,980 | 8/1992 | Ranceze et al. | 524/436 |

FOREIGN PATENT DOCUMENTS

| | | |
|---|---|---|
| 332514 | 3/1989 | European Pat. Off. |
| 54-34356 | 3/1979 | Japan |
| 57-177033 | 10/1982 | Japan |

OTHER PUBLICATIONS

Abstract of EPO 332,514.

Primary Examiner—Veronica P. Hoke
Attorney, Agent, or Firm—Browning, Bushman, Anderson & Brookhart

[57] ABSTRACT

A stabilizer composition for use in halogen-containing polymers comprising hydrotalcite and a molecular-sieve zeolite comprising a Group IA or IIA aluminosilicate.

10 Claims, No Drawings

STABILIZER COMPOSITIONS FOR HALOGEN-CONTAINING POLYMERS AND POLYMER COMPOSITIONS CONTAINING SAME

BACKGROUND OF THE INVENTION

1. Field of the Invention

The present invention relates to stabilizer compositions for halogen containing polymers, particularly polymers of vinyl chloride, and to polymeric formulations containing such compositions.

2. Background of the Invention

Halogen-containing polymers, more general by vinyl chloride polymers (PVC), are commonly used for wire insulation and cable jacketing purposes, particularly for use in office buildings and the like. In order to impart thermal stability to PVC insulation and/or cable jacketing, various thermal stabilizers are incorporated. In particular, lead salts have been used as thermal stabilizers in such PVC formulations. Along with providing heat stability, lead based stabilizers generally impart good electrical insulating properties to the polymeric formulation.

Because of increasing health and environmental concerns, attempts have been made to replace the lead based thermal stabilizers in PVC and other halogen-containing polymeric compositions. For example, a common PVC heat stabilizer comprises a mixture of antimony and tin salts. While these stabilizers are preferable to lead based stabilizers from a health and environmental viewpoint, they generally do not provide the electrical insulating properties which can be achieved using lead based thermal stabilizers.

Ideally, a thermal stabilizer for halogen-containing polymeric composition would contain no heavy metal salts, e.g. lead salts, but would impart thermal stability and electrical insulating properties equivalent or superior to those achieved with lead salts.

SUMMARY OF THE INVENTION

It is therefore an object of the present invention to provide an improved stabilizer composition for use in halogen-containing polymers.

Another object of the present invention is to provide a stabilizer composition for halogen-containing polymers which eliminates the use of salts of heavy metals.

Still another object of the present invention is to provide a halogen-containing polymeric composition containing a thermal stabilizer which is free of heavy metal salts.

The above and other objects of the present invention will become apparent from the description given herein and the claims.

In one aspect, the present invention provides a stabilizer composition for use in halogen-containing polymers comprising a hydrotalcite having the general formula:

wherein x is a number from 0 to 0.5, A is $CO_3^-$ or $SO_4^-$ and, M is a number representing the number of $H_2O$ in the molecule, and a molecular-sieve zeolite having the general formula:

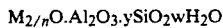

wherein M is a cation of a metal selected from Group IA and Group IIA elements, y is 2 or greater, n is the cation valence, and w represents the water contained in the voids of the zeolite, the ratio Si/Al in the zeolite being greater than about 1, the weight ratio of hydrotalcite to zeolite being from about 0.5 to 1 to about 3 to 1.

In another aspect of the present invention, there is provided a composition of a halogen-containing polymer and an effective amount of the stabilizer composition described above.

DESCRIPTION PREFERRED EMBODIMENTS

The stabilizer composition of the present invention comprises two main ingredience (1) a hydrotalcite, and (2) a molecular-sieve zeolite. The hydrotalcite used in the stabilizer composition of the present has the general formula:

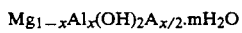

wherein x is a number from 0 to 0.5, A is $CO_3^-$ or $SO_4^-$ and, m is a number representing the number of $H_2O$ in the molecule. The hydrotalcites which can be used includes the various naturally occurring mineral hydrotalcites and synthetic hydrotalcites falling within the above described formula. Such hydrotalcites can be used in the form of their higher fatty acid alkali metal salts or organic sulfonic acid alkali metal salts. Especially preferred are the hydrotalcites wherein x is a number from about 0.1 to about 0.4, A is $CO_3^-$, and m is from about 0.4 to about 0.7, e.g. x is 0.33, A is $CO_3$—and m is 0.5.

The other main component of the stabilizer composition is a molecular-sieve zeolite having the general formula:

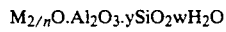

wherein M is a cation of a metal selected from Group IA and Group IIA elements, y is 2 or greater, n is the cation valence, and w represents the water contained in the voids of the zeolite, the ratio Si/Al in the zeolite being greater than about 1. It is preferred that the zeolite be of a type which has an average pore size of greater than about 5 Angstroms, preferably greater than about 10 Angstroms. It is also preferred that an X zeolite be employed rather than an A zeolite. Also preferred, although not necessary is that the cation M be an alkali metal, particularly sodium. For a discussion of zeolites useful in the compositions of the present invention, reference is made to *ENCYCLOPEDIA OF CHEMICAL TECHNOLOGY*, 1981 Vol. 15, Pp 638–653 (herein incorporated by reference for all purposes).

The hydrotalcite and zeolite will be used in the stabilizer composition such that the weight ratio of hydrotalcite to zeolite is from about 0.5 to 1 to about 3 to 1.

In addition to hydrotalcite and zeolite, the stabilizer compositions of the present invention can also contain, with advantage, a beta-diketone. As disclosed in U.S. Pat. No. 4,427,816, beta-diketones and hydrotalcite can be used advantageously as stabilizer compositions in halogen-containing polymers to enhance resistance to heat and light deterioration of the polymers. The beta-diketones which are useful in the compositions of the present invention are disclosed and claimed in U.S. Pat. No. 4,427,816, herein incorporated for reference for all purposes. In particular, the beta-diketones useful are described in column 2, line 11-column 3, line 6 of U.S. Pat. No. 4,427,816. When employed, the beta-diketone will be present in the stabilizer composition, in an effective amount, and will generally constitute from about 1 to about 15 percent by weight of the stabilizer composition.

The stabilizer compositions of the present invention are advantageously used in polyvinyl halide resin compositions comprising a polyvinyl halide resin formed at least in part of the re-occurring group

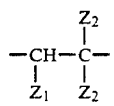

having a halogen content in excess of 40 percent by weight, wherein Z is halogen and $Z_2$ is either halogen or hydrogen. They are particularly useful in PVC compositions, e.g., either homopolymers of vinyl chloride or copolymers of vinyl chloride and at least one other copolymerizable monomer. In general, the stabilizer compositions of the present invention, when used in such halogen containing polymers, will be present in an effective amount, i.e., an amount sufficient to impart sufficient thermal stability and satisfactory electrical insulating properties. More generally, the stabilizer composition will be present in such halogen containing polymeric resins in an amount of from about 0.5 to about 10 parts per hundred parts of resin (phr).

As the data presented hereafter shows, the use of hydrotalcite and zeolite, in general, provides synergistic results in terms of electrical insulating properties, particularly properties such as volume resistivity (VR).

To more fully illustrate the present invention, the following non-limiting examples are presented. In all cases, the compositions are shown in terms of parts per hundred parts of resin (phr).

EXAMPLE 1

Brabender stability testing was conducted on a series of PVC resin formulations. The base resin formulation was as follows:

| INGREDIENT | PHR |
| --- | --- |
| PVC Resin | 100.0 |
| Trioctyl trimellitate | 48.0 |
| Paraffin wax | 0.2 |
| Ca CO$_3$ | 8.0 |
| Clay | 16.0 |
| Antimony oxide | 3.0 |

The base formulation was admixed with various stabilizer compositions to formulate various stabilized PVC formulations. The compositions of the stabilized PVC formulations are shown in Table 1 below.

TABLE 1

| Ingredient | Control | 601-171A | 601-171B | 601-171B1 | 601-171C |
| --- | --- | --- | --- | --- | --- |
| ESO | — | 5.0 | 5.0 | 5.0 | 5.0 |
| Zn stearate | — | 0.5 | 0.5 | 0.5 | — |
| Ca stearate | — | 1.5 | 1.5 | 1.5 | — |
| Alcamizer 1[1] | — | 1.0 | 0.5 | 1.0 | — |
| 13X zeolite[2] | — | — | 0.5 | 0.5 | — |
| Rhodiastab 83[3] | — | 0.1 | 0.1 | 0.1 | — |
| Topanol CA[4] | — | 0.1 | 0.1 | 0.1 | — |
| RUP - 14[5] | — | — | — | — | 3.2 |

TABLE 1-continued

| Ingredient | Control | 601-171A | 601-171B | 601-171B1 | 601-171C |
| --- | --- | --- | --- | --- | --- |
| Halbase 100EP[6] | 3.0 | — | — | — | — |
| Dythal XL[7] | 3.0 | — | — | — | — |

[1]Hydrotalcite having the formula Mg$_{0.67}$Al$_{0.33}$(OH)$_2$(CO$_3$)$_{0.16}$·0.5H$_2$O marketed by Kyowa Chemical Industry Co., Ltd.
[2]Molecular-sieve zeolite (average pore size ~ 13 Angstroms) marketed by UOP.
[3]Dibenzoyl methane marketed by Rhône-Poulenc.
[4]1,1,3-Tris(2-methyl-4-hydroxy-5-t-butyl phenyl)butane anti-oxidant marketed by ICI Specialty Chemicals.
[5]Barium/zinc stabilizer marketed by Adeka Argus Chemical Co., Ltd.
[6]Tribasic lead sulfate marketed by Halstab.
[7]Dibasic lead phthalate marketed by Anzon.

The stabilized compositions of table 1 were subjected to Brabender stability testing under the following conditions: 500 head, 200° C., 100 rpm, 68 g charge. The results are shown in Table 2 below.

TABLE 2

| FORMULATION | DEGRADATION TIME (min)$^a$ | EQUILIBRIUM TORQUE(m-gm) | EQUILIBRIUM TEMP.(°C.) |
| --- | --- | --- | --- |
| Control | 31.3 | 368 | 218 |
| 601-171A | 32.4 | 265 | 216 |
| 601-171B | 33.2 | 305 | 214 |
| 601-171B-1 | 37.4 | 272 | 215 |
| 601-171C | 38.2 | 275 | 214 |

$^a$Average of two measurements.

As can be seen from the data in Table 2, PVC formulations containing the hydrotalcite/zeolite stabilizer compositions of the present invention compare favorably, in terms of thermal stability, with PVC formulations containing only a lead based stabilizer.

EXAMPLE 2

In this example, a series of stabilized PVC formulations was made from a base formulation and various stabilizer compositions and the stabilized PVC formulations subjected to METS-IR testing. METS-IR testing involves molding a PVC sheet around a flat metal electrode and placing the specimen in a constant temperature water bath. The electrical resistance of the composition is then determined and is correlatable to on-wire insulation resistance measurements. The test is based in part an Underwriter's Laboratories Subject 1581 for insulation resistance properties.

The base PVC formulation had the following composition:

| INGREDIENT | PHR |
| --- | --- |
| PVC resin | 100.0 |
| Trioctyl trimellitate | 46.0 |
| Clay | 7.0 |
| Paraffin wax | 0.3 |

In the case of the PVC formulation without any lead stabilizer, the base formulation also contained the following:

| INGREDIENT | PHR |
| --- | --- |
| ESO (epoxidized soybean oil) | 3.0 |
| Ca stearate | 1.5 |
| Zn stearate | 0.5 |

Table 3 below shows the results of the METS-IR testing on various PVC formulations made with various stabilizers.

TABLE 3

| Formulation | Stabilizer | phr | METS-IR (Mohms/1000 ft.) |
|---|---|---|---|
| A | Dythal XL | 7.0 | 5402.7 |
| B | DHT-4A-2[1] | 1.0 | 5409.3 |
| C | DHT-4A-2 | 1.0 | 3543.6 |
|   | Rhodiastab 83 | 0.22 |   |
| D | NaX zeolite[2] | 1.0 | 3469.8 |
| E | DHT-4A-2 | 1.0 | 6266.6 |
|   | NaX zeolite | 1.0 |   |

[1]Anhydrous hydrotalcite having the formula $Mg_{0.67}Al_{0.33}(OH)_2(CO_3)_{0.16}$ marketed by Kyoma Chemical Industry Co., Ltd.
[2]Molecular-sieve zeolite (average pore size ~13 Angstroms) marketed by UOP.

As can be seen from the data in Table 3, the combination of zeolite and hydrotalcite provides excellent METS-IR results as compared with hydrotalcite alone, zeolite alone or hydrotalcite and a beta-diketone.

EXAMPLE 3

Volume resistivity measurements were conducted on a series of PVC formulations using lead stabilization, the stabilizer disclosed in U.S. Pat. No. 4,427,816 and the stabilizer compositions of the present invention. To prepare the stabilized PVC formulations, the following base formulation was employed:

| INGREDIENT | PHR |
|---|---|
| PVC resin | 100.0 |
| Dioctyl phthalate (DOP) | 50.0 |
| Zn stearate | 0.3 |
| Ca stearate | 0.7 |

Using the base formulation, stabilized PVC formulations were prepared using various stabilizer composition. The compositions of the stabilized PVC formulations and VR measurement results are shown in Table 4 below.

TABLE 4

| Formulation | Stabilizer | phr | VR ($\times 10^{13}$) lab |
|---|---|---|---|
| A | Alcamizer 1 | 1.05 | 1.7 |
| B | Alcamizer 1 | 1.0 | 1.85 |
|   | Rhodiastab 83 | 0.05 |   |
| C | NaX zeolite | 1.05 | 1.24 |
| D | NaX zeolite | 1.0 |   |
|   | Rhodiastab 83 | 0.05 | 0.95 |
| E | Alcamizer 1 | 0.525 | 3.19 |
|   | NaX zeolite | 0.525 |   |
| F | Alcamizer 1 | 0.5 | 2.74 |
|   | NaX zeolite | 0.5 |   |
|   | Rhodiastab 83 | 0.05 |   |
| G | Dythal XL | 7.0 | 1.58 |

EXAMPLE 4

A series of stabilized PVC formulations were prepared using various stabilizer compositions and VR data obtained on each of the stabilized formulations. In preparing the stabilized formulations, the following base formulation was employed:

| INGREDIENT | PHR |
|---|---|
| PVC resin | 100.0 |
| DOP | 45.0 |
| Zn stearate | 0.25 |
| Ca stearate | 0.75 |

The compositions of the various stabilized formulations and VR measurements are shown in Table 5 below.

TABLE 5

| Formulation | Stabilizer | VR (ohms-cm) $\times 10^{13}$ |
|---|---|---|
| Comparative* | None | 1.186 |
| 147B | Alzamizer 1(Alc1) | 3.253 |
| 141B | " | 3.251 |
| 84B | " | 5.310 |
| 104B | 4A Zeolite[1] (4A) | 1.265 |
| 104C | 5A Zeolite[2] (5A) | 1.353 |
| 84C | NaX Zeolite | 3.480 |
| 84D | Rhodiastab 83 (Rho 83) | 0.1937 |
| 147C | Alc 1/Rho 83 | 4.082 |
| 141C | Alc 1/Rho 83 | 2.910 |
| 84E | Alc 1/Rho 83 | 4.469 |
| 141D | Alc 1/4A | 3.593 |
| 104H | Alc 1/4A | 3.083 |
| 141E | Alc 1/5A | 3.190 |
| 104I | Alc 1/5A | 2.919 |
| 141F | Alc 1/3A Zeolite[3] (3A) | 2.532 |
| 141G | Alc 1/13X | 5.260 |
| 84H | Alc 1/NaX | 11.67 |
| 104D | 4A/Rho 83 | 0.2874 |
| 104E | 5A/Rho 83 | 0.6930 |
| 84F | NaX/Rho 83 | 2.260 |
| 147D | Alc 1/4A/Rho 83 | 4.087 |
| 104F | Alc 1/4A/Rho 83 | 2.744 |
| 147E | Alc 1/5A/Rho 83 | 4.284 |
| 104G | Alc 1/5A/Rho 83 | 2.971 |
| 147F | Alc 1/3A/Rho 83 | 3.100 |
| 147G | Alc 1/13X/Rho 83 | 8.742 |
| 147H | Alc 1/NaX/Rho 83 | 9.510 |
| 84G | Alc 1/NaX/Rho 83 | 12.33 |
| 104J | Dythal XL | 3.303 |

*Average of four samples
[1]Molecular-sieve zeolite (average pore size ~4 Angstroms) marketed by Zeochem.
[1]Molecular-sieve zeolite (average pore size ~5 Angstroms) marketed by Zeochem.
[1]Molecular-sieve zeolite (average pore size ~3 Angstroms) marketed by UOP.

As can be seen from the data in Table 5, the combination of hydrotalcite and zeolite exhibits synergism as to VR measurements. In particular, when the zeolite has an average pore size of greater than 5 Angstroms, preferably greater than about 10 Angstroms, exceptionally high VR values are obtained (compare Formulations 141G and 84H with Formulation 84C). In this regard is to be noted that the pore size of NaX zeolite and 13X zeolite are both approximately 13 Angstroms. As can also be seen from the data in Table 5, the stabilizer composition of the present invention provides VR measurements much better than obtained with conventional lead stabilized formulations (see for example Formulation 104J). It can also be seen that the stabilizer composition of the present invention provides better VR values than are obtained with the stabilizer composition disclosed in U.S. Pat. No. 4,427,816 (compare for example Formulations 147C, 141C and 84E with Formulations 141G and 84H). It can also be seen that the incorporation of a beta-diketone into the stabilizer compositions of the present invention can provide enhanced VR values (see for example Formulation 147G, 147H, and 84G).

The data above clearly demonstrates that by using the stabilizer composition of the present invention, one can formulate halogen-containing polymeric formulations which do not use lead stabilizers but which possess thermal stability equivalent to such lead containing formulations. Moreover, the polymeric formulations using the stabilizer compositions of the present invention exhibit electrical properties equal to or superior to those obtained using lead based stabilizers.

The foregoing disclosure and description of the invention is illustrative and explanatory thereof, and various changes in the composition may be made within the scope of the appended claims without departing from the spirit of the invention.

What is claimed is:

1. A stabilizer composition for use in halogen-containing polymers comprising a hydrotalcite having the general formula:

$$Mg_{1-x}Al_x(OH)_2A_{z/2} \cdot mH_2O$$

wherein x is a number from 0 to 0.5, A is $CO_3^{--}$ or $SO_4^{--}$ and, m is a number representing the number of $H_2O$ in the molecule and, a molecular-sieve zeolite having the general formula:

$$M_{2/n}O \cdot Al_2O_3 \cdot ySiO_2 \cdot wH_2O$$

wherein M is a cation of a metal selected from Group 1 A and Group II A elements, y is 2 or greater, n is the cation valence, and w represents the water contained in the voids of the zeolite,
the ratio Si/Al in said zeolite being greater than about 1, the weight ratio of hydrotalcite to zeolite being from about 0.5 to 1 to about 3 to 1.

2. The composition of claim 1 wherein said zeolite has an average pore size of greater than about 5 Angstroms.

3. The composition of claim 1 including a beta-diketone.

4. The composition of claim 1 wherein M is sodium.

5. The composition of claim 1 wherein said hydrotalcite has the formula:

$$Mg_{0.67}Al_{0.33}(OH)_2(CO_3)_{0.16} \cdot 0.5H_2O.$$

6. A polyvinyl halide resin composition comprising a polyvinyl halide resin formed at least in part of the recurring group:

$$-CH-\underset{Z_1}{\underset{|}{C}}-\underset{Z_2}{\underset{|}{C}}-$$

and having a halogen content in excess of 40 percent by weight and wherein $Z_1$ is halogen and $Z_2$ is either hydrogen or halogen, and an effective amount of a stabilizer composition according to claim 1.

7. The polyvinyl halide resin composition of claim 6 in which the polyvinyl halide resin is polyvinyl chloride homopolymer.

8. The polyvinyl halide resin composition of claim 7 in which the polyvinyl halide resin is a copolymer of vinyl chloride and a copolymerizable monomer.

9. The polyvinyl halide composition of claim 6 wherein said stabilizer composition is present in an amount of from about 0.5 to about 10 parts per hundred parts of resin.

10. The polyvinyl halide composition of claim 6 wherein said stabilizer composition includes a beta-diketone.

* * * * *